Feb. 6, 1951 E. I. STERN 2,540,144

TELEVISION WITH SCENT EFFECTS

Filed Oct. 13, 1947

INVENTOR:
EMERY I. STERN.
BY: Julian J. Wittal,
HIS ATTORNEY.

Patented Feb. 6, 1951 2,540,144

UNITED STATES PATENT OFFICE 2,540,144

TELEVISION WITH SCENT EFFECTS

Emery I. Stern, Jackson Heights, N. Y.

Application October 13, 1947, Serial No. 779,627

2 Claims. (Cl. 178—5.6)

This invention relates to methods and means to accompany a television showing with release of appropriate scents, and it is an improvement on my copending application for Releasing and Synchronizing Methods and Means for Scents, No. 561,751, filed November 3, 1944.

An object of this invention is to provide means on the screen showing an action by television, said means being adapted to automatically release predetermined scents at predetermined phases of the action.

Other objects of this invention will be apparent as the specification of the same proceeds or will be pointed out therein.

In the drawings forming a part of this specification and accompanying the same:

Figures 1, 2:
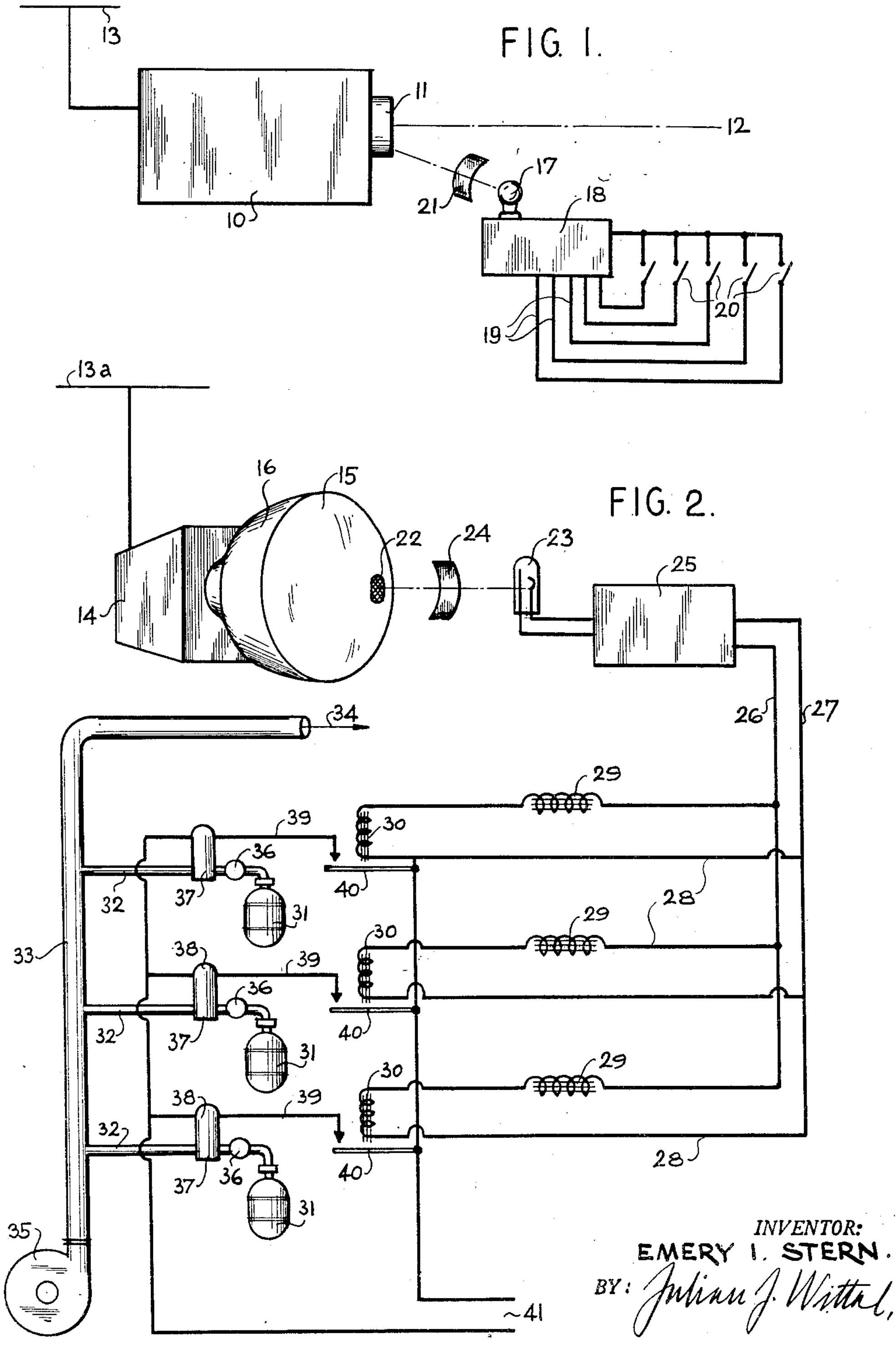
Fig. 1 is a diagram of a television transmitter to which one embodiment of my invention has been applied operated with modulated light.
Fig. 2 is another diagram showing a television receiver with an electric selective system acted upon by the images produced on the screen thereof by said modulated light and controlling the release of the scents.

Referring now to the drawings more in detail by characters of reference, the numeral 10 indicates a television transmitter, in general, the construction of which is well known to those versed in this art.

It may have an iconoscope tube 11 by which it will receive the action to be transmitted to a distant television receiver, the light rays coming from said action being indicated at 12. At 13 and 13*a* are generally indicated the transmitting and receiving aerials representing the link between the television transmitter 10 and the television receiver 14, which, by well known means, transfers the action received into a moving picture shown on the screen 15 and its kinescope tube 16.

In the embodiment here shown, an electric light source 17 is provided, which is operated through an oscillator 18, adapted to generate currents of various predetermined frequencies, which later are selected by the various circuits 19, controlled by the switches 20. The modulated light of the source 17 is concentrated, and thrown on a marginal portion of the iconoscope tube 11 through the lens 21, whereby an image 22 of the modulated light 17 is produced on the television screen 15, preferably of course, at a normally unused marginal portion thereof near its periphery, and preferably also screened off from the observer of the television picture. The modulated light of the image 22 is thrown on a photo-electric cell 23, being concentrated and directed thereto by the lens 24. Thus, the signal image at the iconoscope is scanned just as would any action taking place and this signal image is transmitted or broadcast as modulation of the carrier frequency as is well understood.

Now, according to the frequency of the light 17, a different effect will be produced on the photo-electric cell 23 and an electric current of corresponding frequency will be generated therethrough. The current will be amplified, as at 25, and will be conducted out of the amplifier, let us say, by the line 26, and will return to it, let us say, by the line 27. A desired number of relay circuits, generally indicated by the numerals 28, will be connected into the amplifier circuit 26, 27.

Each relay circuit 28 will have the selective frequency filter 29 inserted thereinto, and each filter 29 will permit only a current of a certain predetermined frequency to pass through the same. An alternating current relay 30 is also included in each relay circuit 28.

Each filter 29 will also, of course, include electrical capacity whether distributed, or in the form of a condenser, for producing the tuned circuit.

The scents to be released at desired moments to accompany respective scenes of the television picture are, in this embodiment of the device, contained in compressed or liquefied gas vessels or tanks 31.

In this embodiment of the device the scents will be combined by appropriate means with appropriate compressed or liquefied gas, like the so-called Freon gas, each tank 31 having a different scent combined with the compressed gas therein. Normally these tanks are closed, and, obviously, when their closure means are opened, the compressed gas will be blown out therefrom, as through the pipes 32, and carry the scent into the duct 33 leading to the auditorium, as indicated by the arrow 34.

Various means may be provided to cause the scent laden gas stream to be diffused in the auditorium in an otherwise unobservable manner. Such methods have been described in my copending application for Releasing and Synchronizing Methods and Means for Scents, No. 561,751, filed Nov. 3, 1944, now abandoned, and as there has been more fully described, and as it is obvious, various heating or cooling devices may be employed to have the diffused air current escape with the right unobservable temperature as well as air streams of predetermined pressures, speeds and quantities may be added to the mixture to produce a desired dilution and entering momentum into the auditorium.

In the diagram of Fig. 2, the compressor producing the necessary air stream, or a part thereof, is indicated at 35. In the embodiment of Fig. 2, the scent containers 31 also will have an adjusting or regulating valve 36, which may be individually adjusted for the respective scent and prevailing conditions.

The scent blowing tubes 32, normally are closed by valves 37 which are operated by electric solenoids 38. When, however, a solenoid 38 is energized, it will open its valve 37 and will release the respective scent 31.

The circuit 39 of each solenoid is normally broken, as indicated by the open resilient switch device 40.

When a relay circuit 28 is activated, through a respective electric frequency passing the amplifier 25, the respective relay 39 will draw the switch 40 into a closed position, whereby the respective solenoid 36 will open the desired scent and permit it to enter the auditorium. The solenoid circuits will receive their electric energy from the source of current 41.

In the operation of the present invention, the action in front of the television transmitter will be observed and the times and sequences for the relays of the respective scents established, whereupon the switches 20 may be closed in a corresponding manner, so that a predetermined frequency image is produced at the desired moment which will act on a predetermined solenoid 38, as will be understood.

What I claim as new and want to protect by Letters Patent of the United States, is:

1. A method for accompanying action on a television receiver viewing screen with scent effects, comprising projecting onto an iconoscope a light signal representative of one of several frequencies, the latter each representing an odor to be released at said receiver, reproducing the light signal on said receiver screen, converting the light signal into an electrical waveform of corresponding frequency, feeding the waveform along a plurality of circuits, only one of the latter having a low impedance to its frequency, to operate a scent-releasing means in the low impedance circuit.

2. A method for accompanying action on a television receiver viewing screen with scent effects, comprising projecting onto a selected portion of an iconoscope a light signal representative of one of several frequencies, the latter each representing an odor to be released in the vicinity of the receiver, reproducing the light signal on a corresponding portion of said receiver screen, converting the light signal into an electrical waveform of corresponding frequency, feeding the waveform along a plurality of circuits, only one of the latter having a low impedance to its frequency, to actuate a scent-releasing valve in the low impedance circuit.

EMERY I. STERN.

REFERENCES CITED

The following references are of record in the file of this patent:

UNITED STATES PATENTS

| Number | Name | Date |
|---|---|---|
| 1,749,187 | Leavell | Mar. 4, 1930 |
| 2,402,083 | Reid | June 11, 1946 |